Patented Feb. 14, 1933

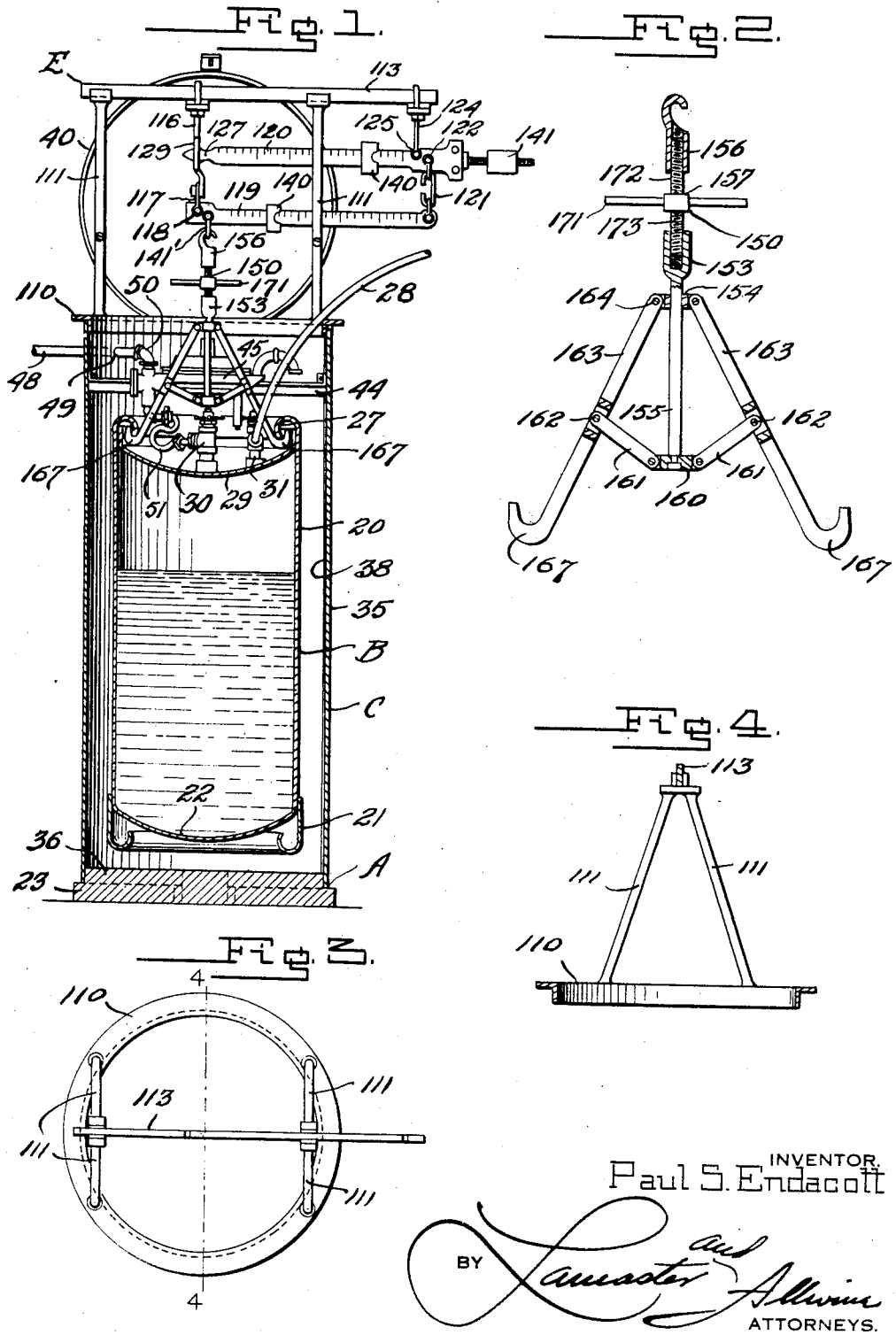

1,897,162

UNITED STATES PATENT OFFICE

PAUL S. ENDACOTT, OF BARTLESVILLE, OKLAHOMA, ASSIGNOR TO PHILLIPS PETROLEUM COMPANY, OF BARTLESVILLE, OKLAHOMA, A CORPORATION OF DELAWARE

WEIGHING APPARATUS FOR TANK CONTAINED LIQUEFIED GAS

Original application filed May 26, 1928, Serial No. 280,746. Divided and this application filed July 27, 1929, Serial No. 381,503. Renewed September 16, 1932.

The present invention relates to apparatus for weighing liquefied gas under superatmospheric pressure in tanks. The present application is a division of that filed by me May 26, 1928, Serial No. 280,746 entitled Methods and apparatus for distribution of liquefied gas.

The primary object of the present invention is to provide apparatus by which the quantity of liquefied gas in tanks may be determined, the apparatus being capable of transportation and ready setting up relative to the tanks one after another so that the quantities in various tanks may be quickly and accurately determined.

The apparatus is particularly well adapted for use by distributors of liquefied gas and in connection with customer's supply tanks such as are shown in said application Serial No. 280,746, and in an application filed by me May 26, 1928, Serial No. 280,745, which discloses and claims the customer's service equipment. By use of this weighing apparatus, the quantity of liquefied gas used by the customer may be determined and it may also be used during the replenishment of the supply in the tank to determine when it has been filled to or approaching its maximum capacity.

Other objects and advantages of the invention will appear in the following detailed description of the preferred embodiment of the invention, taken in connection with the accompanying drawing forming a part of this specification, and in which drawing:

Figure 1 is a view partly in vertical section and partly in elevation of the customer's service equipment and the weighing apparatus in place, and with the tank raised from its normal support so as to permit use of the scales to weigh or measure the amount of liquefied gas which has been used by the customer and to determine when the desired quantity of liquefied gas has been introduced into the tank to replenish the supply for the customer.

Figure 2 is a view in elevation of tongs and adjusting mechanism, by means of which the customer's tank may be elevated for weighing, parts being shown in secton to disclose details.

Figure 3 is a top plan view of a device adapted to be detachably supported by the customer's supply apparatus and to operatively dispose the scale and adjusting mechanism shown in Figure 2 relative to the customer's tank.

Figure 4 is a sectional view on the line 4—4 of Figure 3.

In the drawing A designates equipment placed on the premises of the customer, including a tank B, (containing liquefied gas under superatmospheric pressure), disposed loosely within a housing C; and E the weighing equipment supported by housing C and operatively connected to the tank B.

Referring first to the customer's service equipment A the tank B in the example shown includes a main body part 20 of elongated cylindrical formation and a rigid supporting skirt 21 secured thereto which is adapted to support the bulbular bottom wall 22 of the tank above a base 23 on which the skirt 21 rests, as shown in Figure 1. The tank is vertically supported, and the main body has the upper edge rolled inwardly at 27 above a downwardly concaved head 29. On the head 29 are positioned valves 30 and 31, the latter being used for the introduction of liquefied gas as thru a flexible tubing 28 of distributor's servicing equipment, an example of which is disclosed in said application Serial No. 280,746. The valve 30 is connected to the service line for distribution of gas to the customer's premises.

The tank A is loosely disposed within the housing C which in addition to base 23 includes a cylindrical shaped main body 35, the lower end of which receives the upper reduced portion 36 of the base 23 therein, and a closure 40 which may be hinged to the main body 35 in any suitable manner such as that disclosed in said application Serial No. 280,745.

As shown in Figure 1, a member 44 secured to the main body 35 in spaced relation above the tank B supports a pressure regulator 45, of conventional construction, which is used for the purpose of reducing the pressure between the tank B and a service line 48 which enters the housing C at 49 and has a fitting 50 connected with said regulator 45. The inlet to the pressure regulator 45 is coupled with the outlet valve 30, by means of a flexible metal tube 51, capable of withstanding high internal pressure, and which is slightly looped between its connections, so that the tank may be raised and lowered within the housing C, for the purpose of weighing the same to gauge its contents.

The foregoing disclosure of the customer's service equipment is given merely by way of example to emphasize that the weighing apparatus for the tank contained liquefied gas may be used without the necessity of shutting off the supply of gas to the customer's gas burning equipment.

The weighing apparatus E comprises a base ring-like frame 110, of angle-shaped cross section, adapted to fit within and on top of the housing main body 35 when the lid 40 thereof is open. At diametrically opposed sides of the ring 110, upwardly converging supporting legs 111 are provided, the upper ends of which support a horizontal beam 113, with one end of said beam extending laterally beyond the side of the frame 110 and housing C. Between the diametrically opposed pairs of legs 111 a depending support 116 is provided on beam 113, having a swivel 117 detachably supported on the lower end thereof, the swivel 117 being pivoted at 118 on an end of the graduated scale arm 119 which extends laterally substantially parallel with and below the stationary beam 113. The intermediate balance beam 120 of the scale is pivoted by a link connection 121 at a pivot axis 122 on an outer end thereof, and a connection 124 on the outer end of the stationary beam 113 is pivotally connected at 125 in an offset adjacent relation with the pivot axis 122 on the balance arm 120. The end 127 of the balance arm 120 freely swings in a loop 129 of the connection 116. Weights 140 are slidable on the graduated arms 119 and 120, and an adjusting weight 141 is provided on the outer lateral end of the balance arm 120 laterally of the housing to calibrate the scales. Lifting and suspending means 150 are provided for connection with a swivel 141' on the beam 119 of the scales, and extends downwardly thru frame 110, so that the weight of the customer's tank and its contents may be obtained. The swivel 141' is pivoted adjacent the connection 118, but offset therefrom along the arm 119. This means 150 preferably comprises a longitudinally adjustable supporting standard 153, having clamping tongs including a ring or spider 154 slidable therealong. The longitudinally extensible standard 153 includes a lower elongated supporting portion 155 on which the spider 154 is slidable; a connection 156 for attachment to the swivel 141', and a turn buckle 157 adjustably threaded into the parts 155 and 156. The standard part 155 has a lower connection 160 rotatably mounted thereon, to which brace arms 161 are pivoted; the said brace arms being pivoted at 162 intermediate the ends of tong arms 163; the upper ends of the said arms 163 being pivoted at 164 on the spider or ring 154, and the lower ends of said arms 163 being J shaped at 167, for engagement beneath the roll or flange 27 at the top of the customer's tank 20.

The turn buckle 157 includes a handle 171, with oppositely disposed and oppositely threaded shanks 172 and 173 respectively threaded in sockets of the parts 156 and 155, as shown in Figure 2.

As to the application of the scales to the customer's equipment the same are set upon the top of the housing or main body 35 as above described. The hook ends of the arms 163 are lowered beneath the flanges 27 of the customer's tank B, and the turn buckle 157 is then turned to draw the parts 155 and 156 toward each other. This causes the hook ends of the arms 163 to engage the flange 27, and the braces 161 insure that said arms expand to effect a connection. As the turn buckle shortens the support 153, the tank B is elevated, as shown in Figure 1, and due to the support of the same on the scales, the weights 140 may be adjusted to take care of the major and minor balance operations on the scale balance beams, from which the reading may be effected as is well known. In lieu of the specific scales shown, other scales may be provided suitable for the purpose. After determining the weight of the liquefied gas which has been used by the customer by deducting the weight of that which remains in the tank B from the known maximum capacity of the tank, the scales may be set so as to show when the supply has been replenished to maximum and the scales thus used to facilitate servicing as well as for the purpose of calculating the customer's consumption of gas.

I claim:

1. In weighing apparatus of the class described, a supporting frame comprising an open base frame, oppositely disposed upstanding legs on said frame and a stationary beam carried by the upper end portions of said legs, and extending laterally beyond the base frame, and a scale supported on the beam at points between said legs and on the said laterally extending portion thereof.

2. In weighing apparatus of the class described, a supporting frame comprising an open base frame, oppositely disposed pairs of upstanding legs on said frames, the legs of each pair being in upwardly converging relation and a stationary beam carried by the upper end portions of said pairs of legs and extending laterally of the base frame, and a scale depending from and supported by said beam between said legs and the said laterally extending portion thereof and including a movable beam extending between the legs of one of the pairs of legs.

3. In apparatus of the class described a customer's tank, a housing for receiving the customer's tank in a vertically movable relation therein a service connection to the tank which will permit the tank to be elevated in the housing without discontinuing flow of gas therefrom to the service connection, a frame for detachable connection on the housing above the tank, scales for support by said frame, a longitudinally adjustable support connected with the scales, and gripping tongs connected with said support for gripping said tank whereby the weight of the tank and its contents may be placed on said scales for determining such weight.

4. In apparatus of the class described a customer's tank, a housing for receiving the customer's tank in a vertically movable relation therein, a service connection to the tank which will permit the tank to be elevated in the housing without discontinuing flow of gas therefrom to the service connection, an open supporting base frame for removable disposition upon said housing, a scale, means supporting said scale by and above said frame, and a suspending device operatively connected to the scale and extending downwardly therefrom and through the open supporting base frame to a point entirely below the uppermost portion of said housing and detachably connected to said tank.

5. In apparatus of the class described, a customer's tank, a housing for receiving the customer's tank in a vertically movable relation therein, a service connection to the tank which will permit the tank to be elevated in the housing without discontinuing flow of gas therefrom to the service connection, a frame for detachable connection on the housing above the tank, scales for support by said frame, and manually operable longitudinally adjustable lifting apparatus having means for detachable connection with a tank whereby the weight of the tank and the contents may be placed on said scales.

6. In apparatus of the class described a tank, a housing laterally surrounding the tank in a vertically movable relation therein, a service connection to the tank which will permit the tank to be elevated in the housing without disconnecting flow of gas therefrom to the service connection, a portable scale, a frame for supporting the scale from said housing, and means connected with the scale for lifting the container and its contents so that the weight thereof may be indicated on said scale.

7. In weighing apparatus of the class described, an open supporting base frame adapted to be removably disposed and centered upon a suitable housing, a beam scale having a balance arm, means supporting said scale by and above said frame with the balance indicating end of the balance arm centrally located above said base frame and housing, and a suspending device operatively connected to the scale and extending downwardly therefrom and thru the open supporting base frame to a point entirely below the lowermost portion of said base frame.

8. In weighing apparatus of the class described, a ring-like supporting frame, a beam scale having a balance arm, means supporting said scale by and above said frame with the balance indicating end of the balance arm centrally located above said base frame, and a suspending device operatively connected to the scale and extending downwardly therefrom and thru the ring-like frame.

9. In weighing apparatus of the class described, a supporting base frame for removable disposition upon a suitable support, a beam scale having a balance arm, means supporting said scale upon said frame above the lowermost base portion thereof with the balance indicating end of the balance arm centrally located above said base frame, a suspending device operatively connected to the scale and extending downwardly therefrom, and a load connecting device at the lower end of the suspending device and supported by the suspending device at a point entirely below the lowermost portion of said base frame.

PAUL S. ENDACOTT.